Aug. 7, 1962  H. R. SHILLINGTON  3,048,774
ELECTRICAL BREAKDOWN COUNT TEST SET
Filed April 7, 1959
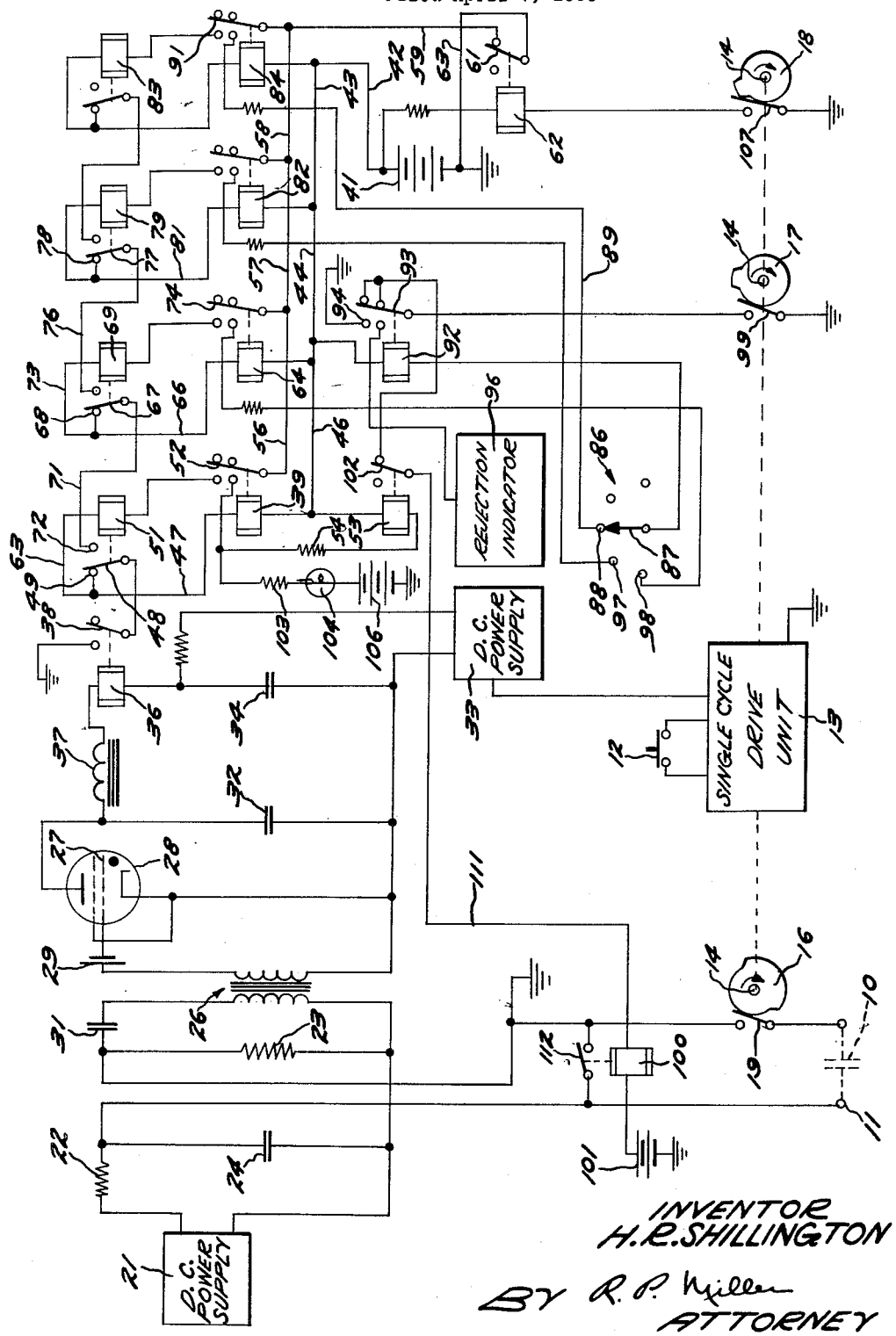
INVENTOR
H.R. SHILLINGTON
BY R. P. Miller
ATTORNEY United States Patent Office 3,048,774
Patented Aug. 7, 1962

3,048,774
ELECTRICAL BREAKDOWN COUNT TEST SET
Harry R. Shillington, Glen Ellyn, Ill., assignor to Western Electric Company, Incorporated, New York, N.Y., a corporation of New York
Filed Apr. 7, 1959, Ser. No. 804,734
7 Claims. (Cl. 324—54)

This invention relates to an electrical breakdown count test set and more particularly, to an electrical test set for counting the number of breakdowns that occur in an electrical component placed across a D.C. test voltage and for simulating a breakdown if no breakdowns are counted to check the operation of the test set.

In D.C. breakdown testing of electrical components, such as capacitors, it is desirable to count the number of breakdowns that occur in the capacitor when the capacitor is placed across a source of D.C. power. The number of breakdowns that occur in the capacitor is an indication of the quality and reliability of the capacitor and therefore, for some uses, capacitors which break down three or four times would be acceptable while for other uses, which require the highest degree of reliability, only one breakdown may indicate that the capacitor is not acceptable.

It is therefore an object of this invention to provide a new and improved electrical breakdown count test set.

Another object of this invention is to provide a test set which will count the number of breakdowns that occur in an electrical component connected across a source of D.C. power.

Another object of this invention is to provide a test set for counting the number of breakdowns occurring in an electrical component connected across a source of D.C. potential and a means for selectively rejecting the component after a predetermined number of breakdowns.

In furtherance of the preceding object, it is another object of this invention to provide a means for automatically simulating a breakdown to check the test set if no breakdowns occur.

With these and other objects in view, the present invention contemplates a test set for applying a D.C. voltage across an electrical component, such as a capacitor under test, which fires an electron tube upon a breakdown occurring in the component. The tube in turn pulses a counting circuit to register the number of breakdowns occurring in the capacitor. The counting circuit is provided with a rejection indicating device which is selectively adjusted to operate after any preselected number of breakdowns. The counter is also provided with a circuit operable at the end of a test cycle, upon no breakdowns being registered in the counting circuit, for simulating a breakdown to test the operation of the test set. Facilities are also actuated at the end of the testing cycle to reset the counting circuit in preparation for a subsequent testing cycle. The test set will therefore count the number of breakdowns that occur in capacitors under test, indicate the capacitors having a preselected number of breakdowns and automatically reset the counter for a subsequent test.

Other objects, advantages and novel aspects of the invention will become apparent upon consideration of the following detailed description in conjunction with the accompanying drawing which discloses a schematic circuit diagram of a D.C. breakdown count set embodying the principles of the present invention.

A capacitor 10, or other electrical components to be tested, is connected across the terminals 11 of the test set and an operator depresses a switch 12 to initiate a cycle of operation of a single cycle drive unit 13 of any commercially available type. The drive unit 13 imparts one complete rotation to a shaft 14 which has cams 16, 17 and 18 mounted thereon. The shaft 14 rotating clockwise causes the raised portion of the cam 16 to close contacts 19 to complete a charging path for the capacitor 10 under test.

The charging path is from a D.C. power supply 21 through resistor 22, capacitor 10, resistor 23 and back to the power supply 21. During the charging of capacitor 10, a capacitor 24 which is connected in parallel with the capacitor 10 also receives the D.C. charge from the power supply 21. The charging circuit is connected by means of transformer 26 to a grid 27 of a thyratron tube 28 which is biased to cut off by a battery 29. A capacitor 31 is placed between the charging circuit and the transformer to prevent the D.C. power from reaching the transformer 26.

If the capacitor 10 under test breaks down, the capacitor discharges through the resistors 22 and 23 and the charge placed on the capacitor 24 attempts to recharge the capacitor 10, thereby sending a transient pulse through the charging circuit. The transient pulse also passes through the capacitor 31 and transformer 26 to raise the potential applied to the grid 27 of the tube 28 to a point above the cut off valve to render the tube conductive.

Upon conduction of the tube 28, a capacitor 32 connected across a D.C. power supply 33 discharges through the tube 28 to maintain the tube ionized a sufficient length of time to permit a capacitor 34 to likewise discharge through the tube 28. The capacitor 34 is also connected across the power supply 33 and discharges through the winding of a relay 36 and an inductance 37. The inductance 37 retards the discharging of the capacitor 34 while the capacitor 32 is discharging through the tube 28 and thereby provides a sufficiently slow discharge of the capacitor 34 to insure a complete operation of the relay 36.

Operation of relay 36 closes contacts 38 to apply ground to one side of relay 39 to complete an energizing circuit for relay 39 from a battery 41 through conductors 42, 43, 44 and 46, the winding of relay 39, a conductor 47, contacts 48 and 49 of a relay 51 through contacts 38 of relay 36 to ground. Operation of relay 39 closes contacts 52 to energize relay 53 from the battery 41 through the winding of relay 53, resistor 54, contacts 52 of relay 39, conductors 56, 57, 58 and 59, contacts 61 of a relay 62 through conductor 63 to ground. Relay 51 does not operate at this time because the relay has ground applied to both sides thereof through the contacts 52 of relay 39 and through the contacts 38 of relay 36.

After the completion of the discharge of capacitor 34 through the tube 28, relay 36 restores and thereby opens contacts 38 and removes ground from the relay 39. Relay 39 remains operated however through the ground connection from conductors 47 and 63, the winding of relay 51, contacts 52 of relay 39 to ground. This ground circuit not only retains relay 39 operated but also operates relay 51 upon the restoration of relay 36.

Upon the next breakdown of the capacitor 10, the capacitor 34 again discharges through the tube 28 to operate relay 36 a second time. Operation of relay 36 connects ground to one side of a relay 64 to complete an energizing circuit for this relay from the battery 41 through the windings of a relay 64, conductor 66, contacts 67 and 68 of relay 69, conductor 71, contacts 72 and 48 of relay 51, contacts 38 of relay 36 to ground. As in the case with relay 51, relay 69 does not operate because ground is applied to both sides of the windings and therefore relay 69 remains inoperative until relay 36 restores. Upon restoration of relay 36, relay 69 is energized by a circuit traced from battery 41, conductors 42, 43 and 44, the winding of relay 64, conductors 66 and 73, the windings of a relay 69, contacts 74 of relay 64, conductors 57, 58 and 59 through contacts 61 of relay 62 and conductor 63 to ground.

Upon the third operation of relay 36, a path is completed from ground through the contacts of relays 36, 51 and 69, conductor 76, contacts 77 and 78 of a relay 79, conductor 81, the windings of a relay 82 and conductors 43 and 42 to battery 41 thereby operating relay 82. In a manner similar to the operations of relays 51 and 69, relay 79 operates upon the restoration of relay 36 to complete a ground circuit for a relay 84 upon the fourth operation of relay 36. Relay 84 operates in a similar manner as relays 64 and 82 and relay 83 operates upon relay 36 restoring for the fourth time.

The relay counting circuit, although shown as counting only four breakdowns of the capacitor 10, may be extended indefinitely to count any number of breakdowns desired. A selector switch 86 controls the number of breakdown counts that will be registered on the counting circuit before a rejection of the capacitor is indicated. In the present example, the wiper 87 of the selector switch 86 is placed upon contact 88 which is in turn connected to ground through conductor 89, contacts 91 of operated relay 84, conductor 59, contacts 61 of relay 62 to ground through conductor 63. Therefore, if it is desired to reject all capacitors having over three breakdowns, relay 84 will operate upon the fourth breakdown and thereby connect ground through the selector switch 86 to operate relay 92 through conductors 44, 43 and 42 to battery 41. Operation of relay 92 closes its contacts 93 and 94 to ground a rejection indicator 96. The rejection indicator 96 may take the form of merely a lamp, a control circuit to shut down the test set, or a mechanical device to physically remove the capacitor 10 from the test terminals 11.

Similarly, the same operation of relay 92 and the rejection indicator 96 will be the same upon the operation of relay 82 or relay 64 when the wiper 87 of the selector switch 86 is connected to contact 97 or 98, respectively. A connection is not made from the selector switch 86 to the relay 39 to reject the capacitor 10 under test upon the first operation of relay 36, because the first application of D.C. power through the resistors 22 and 23 and the capacitors 10 and 24, often sends a transient current through the capacitor 31 and transformer 26 to render the tube 28 conductive as if the capacitor 10 had broken down.

Assuming that no breakdown counts are registered by the relay counting circuit at the end of the testing cycle when the low portion of cam 16 opens contacts 19, the high portion of cam 17 closes contacts 99 momentarily. As no counts have been registered in the counting circuit, relays 53 and 92 are in their restored positions and closure of contacts 99 completes an energizing circuit for a relay 100 from battery 101, the windings of relay 100, conductors 111, contacts 102 of relay 53, contacts 93 of relay 92 and contacts 99 to ground. This energizing circuit operates relay 100 to close contacts 112 which places a direct connection across the test terminals 11 to simulate a breakdown of the capacitor 10. The closure of contacts 112 operates the tube 28 and relays 36, 39, 51 and 53 and as previously described. The operator of the test set will be notified if the set is functioning properly by a lamp 104 which illuminates every time the contacts 52 of relay 39 are closed by a circuit from battery 106, lamp 104, resistor 103 to ground through contacts 52.

The low portion of cam 17 next opens contacts 99 and the high portion of cam 18 closes contacts 107 to operate relay 62. Operation of relay 62 pulls up the contacts 61 which removes ground from all operated relays within the counting circuit to restore the circuit in preparation of a subsequent testing cycle.

The test set has been disclosed and described as being manually placed into each operating cycle by the switch 12 and the capacitors 10 described as being connected to the terminals 11. The test set may be made fully automatic, however, by substituting leaf springs for the terminals 11 which engage the lead wires of capacitors 10 carried past the springs by a conveyor system and the conveyor system may be used to automatically operate the switch 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a testing system for testing a succession of devices, said system including programming means serving sequentially to condition the system for testing, to apply a test signal to the system and to restore the system to normal condition at the end of a test cycle, apparatus for indicating the reception of a selected number of discrete signals comprising test results resulting from the testing of one of said devices, said apparatus comprising a counter actuatable by reception of said discrete signals, first indicator means actuatable by actuation of said counter by reception of a first discrete signal, second indicator means for indicating actuation of said counter a selected number of times by reception of a corresponding number of said discrete signals, and means for confirming system operability, said confirming means including a translating device responsive to a test signal produced by the programming means for applying a discrete test signal to said counter independently of any device being tested to actuate said first indicator means.

2. In a testing system for testing a succession of devices, said system including programming means serving sequentially to condition the system for testing, to apply a test signal to the system and to restore the system to normal condition at the end of a test cycle, apparatus for indicating the reception of a selected number of discrete signals comprising test results resulting from the testing of one of said devices, said apparatus comprising a counter having a plurality of counter stages, the first of said stages being actuatable by a first of said signals, each of said stages when actuated serving to pass subsequent signals to the next successive stage, first indicator means responsive to actuation of said first stage for indicating reception of a first discrete signal, second indicator means, switch means for connecting said second indicator means selectively to said counter stages for indicating actuation of the selected stage and reception of a corresponding number of said discrete signals, means for confirming system operability, said confirming means including a translating device responsive to a test signal produced by the programming means for applying a discrete signal to said counter independently of any device being tested to actuate said first indicator means, and means including a translating device responsive to a restoration signal produced by the programming means for de-actuating any actuated ones of said stages.

3. In a testing system for testing a succession of devices, said system including programming means serving sequentially to condition the system for testing, to apply a test signal to the system and to restore the system to normal condition at the end of a test cycle, apparatus for indicating the reception of a selected number of discrete signals comprising test results resulting from the testing of one of said devices, said apparatus comprising a counter having a plurality of counter stages, each including a first transducer actuatable in response to one of said discrete signals and a second transducer actuatable in response to actuation of said first transducer and being locked in actuated position upon initial actuation thereof, said first transducer of the first of said stages being actuatable by a first signal, said second transducer of each stage when actuated serving to pass subsequent signals to the next successive stage, first indicator means responsive to actuation of said first transducer of said first stage for indicating reception of a first discrete signal, second indicator means, switch means for connecting said second indicator means selectively to said counter stages for indicating actuation of the selected stage and reception of a corresponding number of said discrete signals, means for confirming system operability, said confirming means including a translating device responsive to a test signal produced by the programming means for applying a discrete signal to said counter independently of any device being tested to actuate said first indicator means, and means including a translating device responsive to a restoration signal produced by the programming means for de-actuating any actuated ones of said transducers.

4. Apparatus as specified in claim 3, wherein each of said first transducers is locked in actuated condition through the actuating circuit of the corresponding second transducer.

5. Apparatus as specified in claim 3, wherein a master transducer transmits said discrete signals to said counter when actuated, and each of said second transducers is actuatable by the corresponding first transducer only upon de-actuation of said master transducer.

6. In a testing system for testing a succession of devices, said system including programming means serving sequentially to condition the system for testing and to restore the system to normal condition at the end of a test cycle, apparatus for indicating the reception of a selected number of discrete signals comprising test results resulting from the testing of one of said devices, said apparatus comprising a counter having a plurality of counter stages, each including a first transducer actuatable in response to one of said discrete signals and a second transducer actuatable in response to actuation of said first transducer and being locked in actuated position upon initial actuation thereof, said first transducer being locked in actuated condition through the actuating circuit of the corresponding second transducer, said first transducer of the first of said stages being actuatable by a first of said signals, said second transducer when actuated serving to pass subsequent signals to the next successive stage, indicator means, switch means for connecting said indicator means selectively to said counter for indicating actuation of the selected stage and reception of a corresponding number of said discrete signals, and means including a translating device responsive to a restoration signal produced by the programming means for de-actuating any actuated ones of said transducers.

7. In a testing system for testing a succession of devices, said system including programming means serving sequentially to condition the system for testing and to restore the system to normal condition at the end of a test cycle, apparatus for indicating the reception of a selected number of discrete signals comprising test results resulting from the testing of one of said devices, said apparatus comprising a counter having a plurality of counter stages, each including a first transducer actuatable in response to one of said discrete signals and a second transducer actuatable in response to actuation of said first transducer and being locked in actuated position upon initial actuation thereof, said first transducer of the first of said stages being actuatable by a first of said signals, said second transducer when actuated serving to pass subsequent signals to the next successive stage, indicator means, switch means for connecting said indicator means selectively to said counter for indicating actuation of the selected stage and reception of a corresponding number of said discrete signals, means including a translating device responsive to a restoration signal produced by the programming means for de-actuating any actuated ones of said transducers, and a master transducer for transmitting said discrete signals to said counter when actuated, each of said second transducers being actuatable by the corresponding first transducer only upon de-actuation of said master transducer.

References Cited in the file of this patent

UNITED STATES PATENTS

| | | |
|---|---|---|
| 2,087,783 | Savage | July 20, 1937 |
| 2,440,480 | Lewis | Apr. 27, 1948 |
| 2,614,152 | Herborn | Apr. 29, 1949 |
| 2,619,282 | Manley | Nov. 25, 1952 |
| 2,789,759 | Tootill et al. | Apr. 23, 1957 |
| 2,819,840 | Huntley et al. | Jan. 14, 1958 |
| 2,922,950 | Douglass et al. | Jan. 26, 1960 |

OTHER REFERENCES

Harter et al.: "Go, No-Go Gage Checks Out Bomarc Automatically," Electronics, July 4, 1958, pages 43–45.